F. MEYER.
VEHICLE OR LOCOMOTIVE PUSHER.
APPLICATION FILED JAN. 3, 1915.
1,194,054.
Patented Aug. 8, 1916.
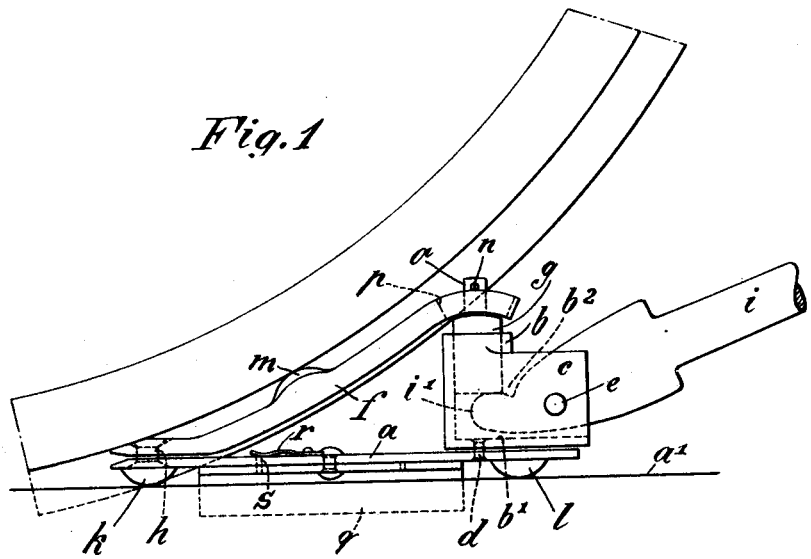
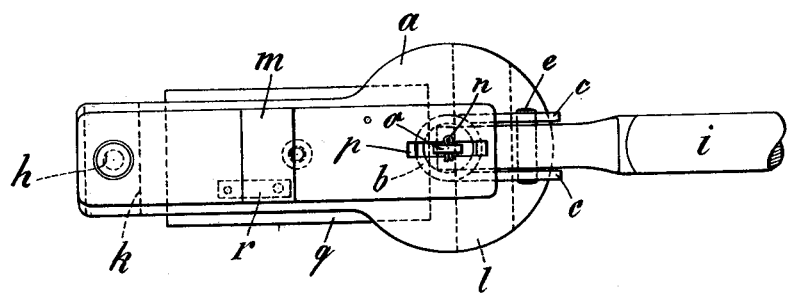

UNITED STATES PATENT OFFICE.

FRIEDA MEYER, OF ZURICH, SWITZERLAND.

VEHICLE OR LOCOMOTIVE PUSHER.

1,194,054.　　　Specification of Letters Patent.　　Patented Aug. 8, 1916.

Application filed January 3, 1916. Serial No. 69,778.

*To all whom it may concern:*

Be it known that I, FRIEDA MEYER, a citizen of the Republic of Switzerland, residing at Zurich, in the Canton of Zurich, Republic of Switzerland, have invented certain new and useful Improvements in Vehicle or Locomotive Pushers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

One of the objects of the present invention is to provide improvements in pushers for propelling carriages, locomotives and other vehicles, which differ advantageously from other carriage pushers by its lightness and in that a high or improved push effect is obtained with small expenditure of force, and another object is to provide an improved arrangement whereby the position of the hand lever can be altered by about 180°, so as to enable the carriage to be pulled forward instead of being pushed. It may be used both for carriages, locomotives and other forms of vehicles.

A form of construction according to the invention, is represented in the accompanying drawing, in which, Figure 1 is a side view, and Fig. 2 a plan veiw.

In the drawing $a$ designates a soleplate or base, which is placed on the rail $a^1$, and $b$ is an upright casing with a bottom $b^1$, lateral aperture $b^2$, and two lateral cheeks $c$. The casing $b$ is connected with the soleplate $a$ by means of a pivot $d$, so that it can be turned or moved about in a lateral direction. Between the cheeks $c$ and in the aperture $b^2$, there is a rounded off end $i^1$ of the short arm of the hand lever $i$, which is adapted to be moved or turned about the bolt or pin $e$ in the two cheeks $c$.

Connected with the front end of the soleplate $a$ by means of a bolt $h$ in such a way as to be turnable vertically and horizontally, is a one-armed push lever $f$ bent according to the circumference of the wheel, for the purpose of turning which, the hole for the bolt $h$ in the push lever $f$ is widened. The upper end of the push lever $f$ is arched, and rests on a correspondingly shaped surface of a plunger or pin $g$, which is carried on the casing $b$ in such a way that it can be moved up or down, and the lower end of which rests upon the rounded off end $i^1$ of the short arm of the lever $i$.

$k$ and $l$ designate transverse ledges or supports situated on the under side of the soleplate $a$, and $m$ a transversal rib situated on the upper side of the push arm $f$, which rib is thickened in the center and thus adapted always to catch or engage the tire in the center of its width.

The carriage pusher, when it is to be used, is placed on one of the rails, and pushed by hand against the carriage or locomotive as the case may be, and is pushed forward until the transversal rib $m$ situated on the push lever $f$, lies against the tire of the wheel. If now the hand lever $i$ is depressed the rounded off end lifts the plunger $g$, and thereby the free end of the push lever $f$ causes the latter to exercise by means of its transversal rib $m$ a turning movement upon the wheel, causing the latter to rotate. In consequence of the considerable leverage of the two-armed lever $i$ and its action upon the one-armed push lever $f$, the heaviest carriages and locomotives may be pushed along by means of this pusher. The plunger has an extension $o$ which is preferably rounded at its upper end, and extends through a slot $p$ in the push-lever $f$, and a cotter $n$ secures the extension in the slot and admits of vertical oscillations of the push lever $f$.

By the use of the pivot $d$, the lever $i$ can be placed at any desired angle relatively to the direction of the rails, the operator therefore, for the purpose of pushing along the car, need not absolutely place himself behind the car or carriage to be pushed and without interfering with the operating parts and with the same effect, may place himself in the position that suits him best, such as alongside of the wheel.

If necessary, the handlever $i$ may be placed by the operator in a position differing by about 180°, when so to speak, a pulling forward of the carriage instead of a pushing, takes place.

In order to effectively prevent the carriage pusher slipping off the rail surface, a guide plate $q$ of angular section may be so hinged on the under side of the soleplate $a$ between the transverse ledges $k$ and $l$, and so arranged for being fixed by means of a spring $r$ with adjusting pin $s$, that the upright leg of this plate may be placed against the inner side of each of the two running rails. Thus the pulling off of the carriage pusher from the rail, in case the handlever $i$ is placed obliquely or vertically to the said rail, is prevented.

Instead of forming a transversal rib $m$, the push lever $f$ may be fitted with a sharpened stud, pin or ridged plate inserted into it.

What I claim is:

1. A vehicle or locomotive pusher, comprising a base, a push lever movably connected to the front end of the base and acting upon the wheel, a casing arranged in a turnable manner on the after end of the base, a lever pivotally mounted in the casing and an intermediate member movable in the casing, acting at the top upon the upper end of the push lever and receiving at the lower end the pressure from the lever, the latter being capable of working in any oblique position from 0° to approximately 180°.

2. A vehicle or locomotive pusher, comprising a supporting base, a curved push lever movably connected to the front end of the base and acting upon the wheel, a casing arranged in a laterally turnable manner on the after end of the base and having a lateral aperture and two side cheeks, a lever pivotally mounted between the side cheeks of the casing and entering with its front end into the said aperture, and an intermediate member movable in the casing, acting at the top upon the upper end of the push lever and receiving at the lower end the pressure from the hand lever, the latter being capable of working in any oblique position from 0° to approximately 180°.

3. A vehicle or locomotive pusher, comprising a supporting base having transversal ledges on the under side, a push lever movably connected to the front end of the base, having a driving projection and acting upon the wheel, a casing arranged in a laterally turnable manner on the after end of the base, a lever pivotally mounted in the casing and an intermediate member in the form of a plunger movable in the casing and resting on the front end of the lever, the upper portion of the plunger having a slightly rounded off supporting surface for the push lever and terminating as a pin extending through a slot in the push lever, the lever being capable of working in any oblique position from 0° to approximately 180°.

4. A vehicle or locomotive pusher, comprising a base, a push lever movably connected to the front end of the base and acting upon the wheel, a casing arranged in a laterally turnable manner on the after end of the base, a lever pivotally mounted on the casing, an intermediate member movable in the casing, acting at the top upon the upper end of the push lever and receiving at the lower end the pressure from the lever and a guide plate of angular section pivotally mounted on the lower side of the base and having means for securing it in the operative position, the lever being capable of working in any oblique position from 0° to approximately 180°.

5. A vehicle or locomotive pusher, comprising a base having two transversal ledges on the under side, a curved push lever vertically and horizontally movably connected to the front end of the base, having a driving projection on the upper face and acting upon the wheel, a casing arranged in a laterally turnable manner on the after end of the base and having a lateral aperture and two side cheeks, a lever pivotally mounted between the side cheeks of the casing and entering with its front end into the aperture of the casing, an intermediate member in the form of a plunger movable in the casing and resting on the front end of the lever, the upper portion of the plunger having a slightly rounded off supporting surface for the push lever and terminating as a pin extending through a slot of the push lever and a guide plate of angular section pivotally mounted on the lower side of the base and having two holes each of same receiving a spring actuated locking pin in the respective operative position of the guide plate, the lever being capable of working in any oblique position from 0° to approximately 180°.

In testimony whereof, I have signed my name to this specification in the presence of two subscribing witnesses.

FRIEDA MEYER.

Witnesses:
 HERMANN HUBER,
 CARL SEEVER.